United States Patent [19]

Gagnon

[11] Patent Number: 4,544,237
[45] Date of Patent: Oct. 1, 1985

[54] HIGH EFFICIENCY OPTICAL TANK FOR TWO-COLOR LIQUID CRYSTAL LIGHT VALVE IMAGE PROJECTION WITH COLOR SELECTIVE PREPOLARIZATION

[75] Inventor: Ralph J. Gagnon, Chico, Calif.

[73] Assignee: Hughes Aircraft Company, El Segundo, Calif.

[21] Appl. No.: 334,681

[22] Filed: Dec. 28, 1981

[51] Int. Cl.[4] ..................... G02F 1/13; G03B 21/00
[52] U.S. Cl. ..................... 350/331 R; 350/408; 353/31
[58] Field of Search ............... 350/342, 345; 353/31, 353/34, 37

[56] References Cited

U.S. PATENT DOCUMENTS

| | | | |
|---|---|---|---|
| 4,019,807 | 4/1977 | Boswell et al. | 350/342 |
| 4,191,456 | 3/1980 | Hong et al. | 350/342 X |
| 4,345,258 | 8/1982 | Tsai et al. | 350/31 X |
| 4,464,018 | 8/1984 | Gagnon | 350/31 R |
| 4,464,019 | 8/1984 | Gagnon | 350/31 X |

OTHER PUBLICATIONS

Hong et al., Application of the Liquid Crystal Light Valve to a Large Screen Display.

Primary Examiner—John K. Corbin
Assistant Examiner—David Lewis
Attorney, Agent, or Firm—W. J. Benman, Jr.; S. C. Durant; A. W. Karambelas

[57] ABSTRACT

The invention provides a two-channel liquid crystal light valve image projection system with prepolarization using an oil coupled optical arrangement. A prepolarizing beam splitter is mounted the container in optical alignment with a first surface for splitting and prepolarizing light from a source into first and second beams having first and second polarization states respectively. First and second dichroic separators are mounted within the container for extracting light of a first color from the first beam and light of a second color from the second beam respectively. The separator outputs are recombined by the prepolarizing prism into a single beam which is directed to a second polarizing beam splitter mounted within the container. The second beam splitter splits the single beam and directs light of the first and second polarizations through the second and third apertures, respectively. Liquid crystal light valves mounted at the second and third apertures modulate the polarization state of the exiting light and return it to the second beam splitter to be directed through the output aperture to projection optics for display.

13 Claims, 1 Drawing Figure

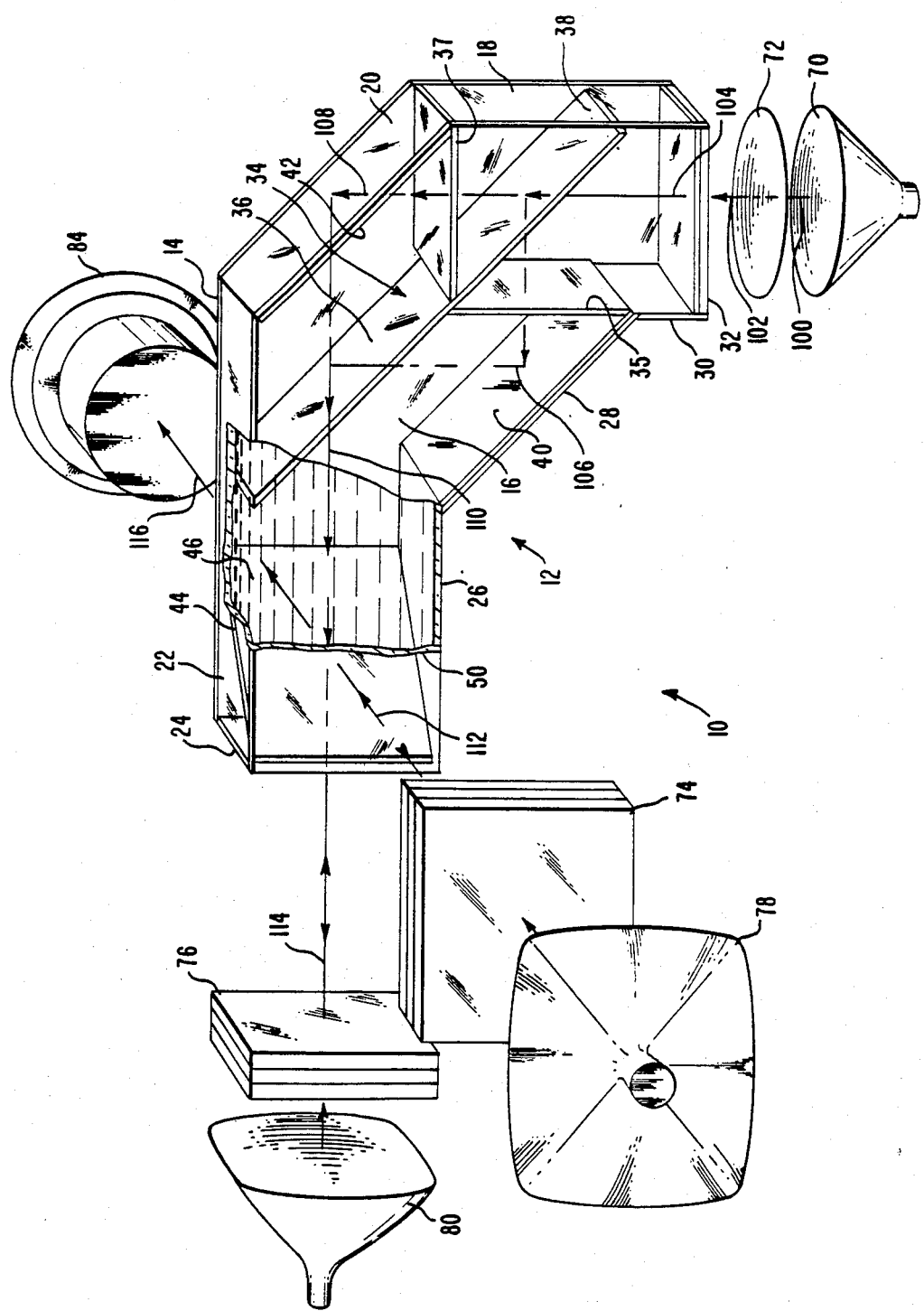

HIGH EFFICIENCY OPTICAL TANK FOR TWO-COLOR LIQUID CRYSTAL LIGHT VALVE IMAGE PROJECTION WITH COLOR SELECTIVE PREPOLARIZATION

BACKGROUND OF THE INVENTION

1. Field of the Invention

This invention related to liquid crystal light valve projectors. Specifically, this invention relates two color liquid crystal light valve projectors with oil coupled dichroics.

While the present invention will be described herein with reference to particular applications, it is to be understood that the invention is not limited thereto. Those having ordinary skill in the art and access to the teachings of this invention will recognize additional applications within the scope thereof.

2. Description of the Prior Art

The development of the liquid crystal light valve has opened the door to substantial progress in the state of the art of high quality large screen projectors. The reflective mode liquid crystal light valve is a thin film, multilayer structure comprising a liquid crystal layer, a dielectric mirror, a light blocking layer, and a photoresponsive layer sandwiched between two transparent electrodes. A polarized projection beam is directed through the liquid crystal layer onto the dielectric mirror. An input image of low intensity light, such as that generated by a cathode ray tube, is applied to the photoresponsive layer thereby switching the electric field across the electrodes from the photoresponsive layer onto the liquid crystal layer to activate the liquid crystal. Linearly polarized projection light passing through the liquid crystal layer and reflecting from the dielectric mirrors is polarization-modulated in accordance with information incident on the photoconductor. Therefore, if a complex distribution of light, for example, a high resolution input image, is focused onto the photoconductor surface, the device converts the image into a replica which can be projected with magnification to produce a high brightness image on a viewing screen. U.S. Pat. No. 4,019,807 issued to D. D. Boswell et al on Apr. 26, 1977 discloses such a high performance reflective mode liquid crystal light valve.

A graphics display projector using a liquid crystal light valve of the above-type is described in an article entitled "Application of the Liquid Crystal Light Valve to a Large Screen Graphics Display", published in the 1979 *Society for Information Display*, (SID), International Symposium, Digest of Technical Papers, May 1979, pp. 22-23. This display system, a type with which the present invention is particularly but not exclusively concerned, projects a large scale image having yellow-white characters on a dark blue background. The system includes a cathode ray tube (CRT) which provides input imagery; projection optics which provide the bright collimated output beam and necessary light polarization; and the liquid crystal light valve which interfaces the input and output functions.

The system uses a powerful light source such as a xenon arc lamp to illuminate the liquid crystal light valve through collimating and polarizing optics. Light emitted from the xenon arc lamp is transmitted to a polarizing main prism where it is separated into 'S' and 'P' components. The 'P' component passes through the prism while the 'S' component is reflected toward the light valve. Information displayed by cathode ray tube is transferred by fiber optics to one side of the light valve which changes the polarization state from 'S' to 'P'. The light is then transmitted through the prism and imaged on a screen by projection lens. In this capacity, the main prism functions as an analyzer, converting modulations of polarization to modulations of brightness or intensity.

The quality of the projected image is generally a function of brightness, resolution and contrast. Image quality can generally be improved by placing a prepolarizing prism in the optical path in front of the main polarizing prism. The prepolarizing prism is somewhat effective in overcoming the deficiencies in the main polarizing prism. That is, since the main polarizing prism is not 100% effective in transmitting light of one polarization and reflecting light of another, light of an undesirable polarization may reach the light valve and be modulated and reflected back through the main prism onto the projection lens. This often results in distortions of color and/or reductions in contrast and resolution.

Since the prepolarizing prism may, for reasons of cost, be of the same design as the main prism, it would typically have similar reflectance and transmittance characteristics. However, when the two prisms are used in combination, the additive effect is such as to greatly improve the quality of the projected image. The prepolarizing prism substantially removes light of one polarization from the beam which illuminates the main prism. The main prism then acts on the beam to substantially remove the residual light of the undesirable polarization.

In some applications, it is desirable to use a second liquid crystal light valve for enhanced information displaying capability and versatility. In this application, the use of the prepolarization prism becomes problematic insofar as the light valve would require light of the polarization that would otherwise be removed by the prepolarizing prism. As a result, the use of a second light valve has forced a compromise in the quality of the projected image.

This problem was addressed by the Applicant and Roy Cedarstrom and Ralph Gagnon in a copending application entitled "Two-Color Liquid Crystal Light Valve Image Projections System with Single Prepolarizer" Ser. No. 06/334,679, now U.S. Pat. No. 4,500,872. It provides a color selective prepolarization of the light incident upon two or more light valves. This is accomplished by use of a prepolarizing prism which acts on light from a light source to direct light of a first polarization to a first dichroic separator and light of a second polarization to a second dichroic separator. The resulting beams are recombined in a dichroic adder prior to being applied to a second polarizing prism. The second polarizing prism directs light of a first color and polarization to a first light valve and light of a second polarization to a second light valve in the conventional manner.

This system, though effective, is bulky insofar as each prism is essentially a small tank with one or more optical thin film layers immersed in glass or oil. The system of the copending application requires air coupling to the immersed beam splitters. The resulting arrangement requires much attention to the proper alignment of the components while offering less than optimal performance. It is known that the coupling of the beam splitters through oil would improve the performance of this system.

SUMMARY OF THE INVENTION

The present invention provides a two-channel color selective prepolarization in oil with oil coupled dichroics. The invention includes a prepolarizing beam splitter for splitting and prepolarizing light from the source into first and second beams having first and second polarization states, respectively. First and second dichroic separators are included for extracting light of a first color from the first beam and light of a second color from the second beam respectively. The resultant output of each separator is a collimated polarized monochromatic beam. The separator outputs are recombined by a beam combiner into a single beam which is directed to a second beamsplitter (main prism). The main prism splits the single beam and directs light of the first and second polarizations through the second and third apertures, respectively. Liquid crystal light valves mounted at the second and third apertures modulate the polarization state of the exiting light and return it to the main prism to be directed to the fourth aperture. The system thus provides two-channel prepolarization by way of an oil coupled optical arrangement.

BRIEF DESCRIPTION OF THE DRAWINGS

The FIGURE is a perspective view of a diagramatic representation of a preferred embodiment of the present invention.

DETAILED DESCRIPTION OF THE INVENTION

As shown in the FIGURE, the invention 10 includes a container 12 made of metal, plastic, glass or other suitably rigid material. In the preferred embodiment, the container is glass. The container 12 is dimensioned to provide the most compact unit with regard to the requirements that the polarizers be oriented at a predetermined angle relative to incident light. The container is hollow having walls on the order of ¼ inches thick. The exterior dimensions of the container are determined with regard to the dimensions of the associate optical components discussed below. In the preferred embodiment, the container is filled with optical grade oil having an index of refraction of 1.622. It is understood that glass or oils of other indices of refraction may be used without departing form the scope of this invention. Note that the use of oil or glass of another index may require a change in the below described design of optical components. The container 12 has side surfaces 14 and 16, rear surfaces 18 and 20, top surface 22, front surface 24, and lower surfaces 26, 28, 30 and 32. The surfaces 14–32 may include milled grooves, posts or special adhesives (not shown) which are effective in maintaining the optical components in proper alignment and effectively sealing the spaces therebetween. As described more fully below, surfaces 14, 16, 24 and 32 are transparent and provide apertures through which light enters and leaves the system.

The surface 32 provides an input aperture. In the preferred embodiment it is a glass sharp-cut Schott GG47S filter having an index of refraction of 1.54. The surface 32 is coated to reflect ultraviolet light and prevent overheating. In the preferred embodiment, the coating is constructed at a wavelength (or optical thickness) $\lambda = 390$ nm. It includes a first layer of depth $d = 1.49$ quarter waves and index of refraction $n = 1.92$. This first layer is topped with 10 sets of layers of depth $d = 0.5$ quarter waves and index $n = 1.46$, a second layer of depth $d = 1$ quarter wave and $n = 2.32$ and a third layer of depth $d = 0.5$ quarter wave and index $n = 1.46$. These sets of layers are topped with a final layer of depth $d = 1.49$ quarter waves and index $n = 1.55$. This coating also serves as an anti-reflection coating for red and green wavelengths.

A prepolarizing beam splitter 34 is mounted within the container 12 so that its transverse axis lies between surfaces 14 and 16. It is disposed in optical alignment with the ultraviolet filter at surface 32. The prepolarizing beam splitter 34 is constructed of glass or optical grade fused silica having a birefringence less than or equal to 6 nm/cm and an index $n = 1.62$. The prepolarizer 34 is a plate which, in the preferred embodiment, has dimensions of $7.6'' \times 2.9'' \times \frac{1}{8}''$. The prepolarizer 34 has an upper portion 36 and a lower portion 38. The lower portion 38 serves as a prepolarizing beam splitter. The upper portion 36 serves as a beam combiner. The prepolarizing beam splitter 34 has a thin film coating which, in the preferred embodiment, is constructed at an optical thickness $\lambda = 500$ nm. The coating includes a first layer of depth $d = 1.557$ quarter waves and index $n = 2.05$; a second layer of depth $d = 0.994$ quarter waves and index $n = 1.35$; five sets of layers each set having a first layer of depth $d = 1.157$ quarter waves and index $n = 2.32$ and a second layer of depth $d = 1.988$ quarter waves and index $n = 1.35$; followed by a layer having a depth $d = 1.157$ quarter waves and an index $n = 2.32$; followed by a layer of depth $d = 0.994$ quarter waves and an index $n = 1.35$; and a final layer of depth $d = 1.557$ quarter waves and an index $n = 2.05$.

The prepolarizing beam splitter 34 is mounted so that as its transverse axis is horizontal to the plane of the input aperture 32. In the preferred embodiment, it was found than an orientation of the longitudinal axis of 48° relative to incident light provides the best compromise between contrast, size and cost. It should be noted, however, that other orientations may be employed without departing from the scope of the invention. A change in orientation will typically require a change in the design of the container 12 as well as the coating on the prepolarizer 34. Such a change is nonetheless within the scope of the invention.

A red pass filter 35 is mounted between the prepolarizer 34 and the intersection of surfaces 28 and 30. A green pass filter 37 is mounted between the prepolarizer 34 and the intersection of surfaces 18 and 20. Each filter is made of an optical grade of fused silica having an index of refraction $n = 1.62$ and a birefringence less than or equal to 6 nm/cm. In the illustrative embodiment, each has dimensions $2.9'' \times 2.6'' \times \frac{1}{8}''$. The red filter 35 is coated to pass red light and reflect light of other colors. The coating includes a first layer of depth $d = 1.228$ quarter waves and index $n = 2.32$; 13 sets of layers each set having a first layer of depth $d = 0.5$ quarter waves and index $n = 1.46$; a second layer of depth $d = 1$ quarter waves and index $n = 2.32$ and a third layer of depth $d = 0.5$ quarter waves and index $n = 1.46$; and a final layer of depth $d = 1.228$ quarter waves and index $n = 2.32$. The construction is at an optical thickness $\lambda = 492$ nm.

Similarly, the green filter 37 is coated to pass green light and reflect light of other colors. Its coating includes a first and last layer of depth $d = 0.85$ quarter waves and index $n = 2.32$ between which 15 sets of layers are sandwiched, each set including a first layer of depth d=0.5 quarter waves and index n=2.05, a second layer of depth d=1.0 quarter waves and index n=1.6, and a third layer of depth d=0.5 quarter waves and index n=2.05. This construction is at an optical thickness λ=640 nm.

A first mirror 40 is disposed on the interior of the surface 28. The mirror 40 is of a conventional construction with birefringence less than 6 nm/cm. No optical thin film coatings are required. The mirror may be constructed of Schott F2 glass of index of refraction of 1.62. The mirror dimensions are 4.3"×2.9"×⅛".

A second mirror 42 is mounted on the interior of surface 20. The mirror 43 is identical to the mirror 40 with the exception that its dimensions are 3.7"×2.9"×⅛". It should be noted that the relative positioning of the filters 35 and 37 and the mirrors 40 and 42 may be changed so that the filters are in the optical path after the mirror without departing from the scope of the invention.

The main polarizer 44 is the second polarizing beam-splitter of this invention. It is oriented at a twist relative to the prepolarizing beam splitter 34 such its transverse axis lies between surfaces 22 and 26, perpendicular to the transverse axis of the prepolarizing beam splitter 34. As a result, the beam-splitting and color separating plates are perpendicular to a common vertical plane in the prepolarizing section while the plates in the main polarizer are perpendicular to a horizontal plane. This results in two advantages. First, this allows the illumination light to be brought in on a vertical line from below the prepolarizer 34 thereby reducing physical awkwardness. Second, it results in improved polarizing beam splitter performance. According to calculations the performance improvement significantly obviated the necessity for trim filters at the light valve and the exist windows. This performance improvement results from the fact that with most currently available polarizers, polarization by transmission is more effective than polarization by reflection. That is, when the prepolarizer 34 reflects S polarized light through the red filter 35 and transmits P polarized light through the green filter 37, some P polarized light is also reflected to the red filter 35. Without the 90° twist, and since for reasons of economy the main polarizer has the same design as the prepolarizer 34, the main polarizer would similarly reflect some green P polarized light to the red light valve. This necessitates the use of a light lowering red trim filter in front of the red light valve to remove the reflected green P polarized light. The problem is further exacerbated by the fact that the transmission of green P polarized light to green light valve in the off state will result in the reflection of the green P polarized light back to the main polarizer 44. Most of this light will pass through the polarizer 44 and return to the illumination system. However, once again some green P polarized light is reflected to the red light valve by the beam splitter 44. This light reaches the projection screen and lowers image contrast.

Since the 90° twist at the main polarizer 44 interchanges the roles of S and P polarized light, the main polarizer 44 sees green S and red P polarized light. Since there is no green P polarized light present at the main polarizer 44, no trim filter is required at the red light valve. Thus, the system is more efficient and the displayed image is brighter. In addition, no green P is projected on the screen and the displayed image has greater contrast.

The main polarizer 44 is constructed of Schott F2 glass with an index of refraction of 1.62. The main polarizer 44 is mounted so that light will be incident on it at an angle of 48° relative to its longitudinal axis. It has dimensions of 3.4"×2.5"×¼". As mentioned above, the main prism 44 has the same thin film coating as the prepolarizing beam splitter 34.

A source 70 and collimating optics 72 are mounted in optical alignment with the input surface 32. Liquid crystal light valves 74 and 76 are mounted parallel with surfaces 16 and 24, respectively. Cathode ray tubes 78 and 80 are mounted in optical alignment with liquid crystal light valves 74 and 76, respectively.

In operation, the source 70 emits unpolarized light which is collimated by lens 72 and filtered by UV filter at surface 32. The filtered collimated unpolarized light is incident on the prepolarizing beam splitter 34 at an angle of 48°. The S polarized light is transmitted through the red filter 35 and reflected by mirror 40 to the upper portion 36 of the prepolarizer 34. The P polarized light is transmitted through a green filter 37 and reflected by mirror 42 to the upper portion 36 of the prepolarizing beam splitter 34. The prepolarizing beam splitter 34 recombines the beams into a single beam and reflects it to the main polarizer 44. As discussed above, since the main polarizer 44 has a traverse axis perpendicular to that of the prepolarizer 34, the polarization states of the incident light are reversed. The red S output of the prepolarizer 34 becomes a red P relative to the main polarizer 44 and is transmitted to the liquid crystal light valve 76. Similarly, the green P component transmitted via the prepolarizer 34 is reflected as green S by the main polarizer 44 to the light valve 74. The light valves 74 and 76 modulate the polarization states of incident light in accordance with writing light provided by cathode ray tubes 78 and 80 in a conventional manner. The polarization modulated light is returned to the main polarizer 44 where modulations of polarization are converted to modulations of intensity and are transmitted to the projection lens 84. It should be noted that many of the above described optical coatings were designed and performance evaluated by the Thin Film computer program provided as a service by the Genesee Company of Rochester, N.Y.

The present invention has been described with reference to a particular embodiment in a particular application. It is understood that other designs of the container may be utilized without departing substantially from the scope of the present invention. It is also understood that certain modifications can be made with regard to the selection of polarizaton components to be filtered by the red and green filters, respectively. In addition, other dichroic filters may be utilized without departing from the scope of the invention. The prepolarizing beam splitter 34 need not be a unitary beam splitter but may, instead, be two separate prepolarizing beam splitters. Although the invention of the preferred embodiment is immersed in an optical grade oil of an index of refraction of 1.622, glass or oils of other indices may be chosen in accordance with the particular design of the system 10. It is anticipated by the appended claims to cover any and all such modifications.

What is claimed is:

1. A unitary arrangement comprising:
a first planar polarizing beam splitter for splitting and prepolarizing light from a source into first and second beams having first and second polarization states, respectively;

a first dichroic separator for extracting light of a first color from said first beam;

a second dichroic separator for extracting light of a second color from said second beam;

means for combining the outputs of said first and second dichroic separators into a single beam; and a second polarizing beam splitter for splitting and polarizing the single beam and directing light of the first color to a first surface and light of the second color to a second surface, wherein the first and second polarizing beamsplitters have transverse axes and each beamsplitter is mounted so that the beamsplitter transverse axes are oriented at a relative 90° angle.

2. The unitary arrangement of claim 1 including mirror means for directing the outputs of said first and second separators to said means for combining the outputs of said first and second separators.

3. A multi-color image projection system comprising: first means for providing a source of light energy; and a unitary tank including a first polarizing beamsplitter for splitting and prepolarizing light energy from said first means into first and second means having first and second polarization states respectively, a first dichroic separator for extracting light energy of a first color from said first beam, a second dichroic separator for extracting light energy of a second color from said second beam, means for combining the outputs of said first and second dichroic separators into a single beam and a second polarizing beamsplitter for directing light energy of the first color to a first light valve, light energy of the second color to a second light valve and light energy from said first and second light valves to a means for projection, wherein the first and second polarizing beamsplitters have transverse axes and each beamsplitter is mounted so that the beamsplitter transverse axes are oriented at a relative 90° angle.

4. The unitary arrangement of claim 3 wherein the beamsplitters, separators and means for combining are coupled through oil.

5. The multicolor image projection system of claim 3 including first and second cathode ray tubes for providing an input image for said first and second liquid crystal light valves respectively.

6. The multi-color image projection system of claim 3 wherein the beamsplitters, separators and means for combining are coupled through oil.

7. The multi-color image projection system of claim 3 including mirror means for directing the outputs of said first and second separators to said means for combining the outputs of said first and second separators.

8. In an optical system including means for providing light energy, first and second liquid crystal light valves, first and second cathode ray tubes for use with said first and second liquid crystal light valves, respectively, and a means for projection, an improved optical arrangement comprising:

a container having a plurality of surfaces joined together to form a chamber suitable for holding fluid, including a first surface for providing an input aperture, second and third surfaces each providing an output aperture for polarized and an input aperture for modulated light, energy and a fourth surface for providing an output aperture;

a prepolarizing beamsplitter mounted within said chamber for splitting and prepolarizing light energy from the source into first and second beams having first and second polarization states respectively;

a first dichroic separator mounted within said chamber for extracting light energy of a first color from said first beam and a second dichroic separator for extracting light energy of a second color from said second beam;

means mounted in said chamber for combining the output of the first and second separators to form a single beam; and a main polarizing beamsplitter mounted in said chamber for directing light of a first color and polarization through the second aperture to the first liquid crystal light valve and light energy of a second color and polarization through the third aperture to the second liquid crystal light valve and directing intensity modulated light energy through said fourth aperture to a means for projection, wherein said prepolarizing beamsplitter and said main polarizer have transverse axes and each beamsplitter is mounted so that the beamsplitter transverse axes are oriented at a relative 90° angle.

9. The optical system of claim 8 wherein the prepolarizing beamsplitter and the main polarizing beamsplitter are substantially identical.

10. A unitary arrangement comprising:

a first polarizing beamsplitter for substantially splitting and polarizing light from a source into first and second beams having S and P polarization states, respectively;

a first dichroic separator for substantially extracting red light from said first beam;

a second dichroic separator for substantially extracting green light from said second beam;

means for combining the outputs of said first and second dichroic separators into a single beam; and a second polarizing beamsplitter for polarizing the single beam and directing red light to a first surface and green light to a second surface, wherein the first and second polarizing beamsplitters have transverse axes and each beamsplitter is mounted so that the beamsplitter transverse axes are oriented at a relative 90° angle.

11. The unitary arrangement of claim 10 wherein the beamsplitters, separators and means for combining are coupled through oil.

12. The unitary arrangement of claim 10 including mirror means for directing the outputs of said first and second separators to said means for combining the outputs of said first and second separators.

13. The unitary arrangement of claim 10 wherein the first and second polarizing beamsplitters are substantially identical.

* * * * *